(12) United States Patent
Takahashi et al.

(10) Patent No.: US 9,239,435 B2
(45) Date of Patent: Jan. 19, 2016

(54) OPTICAL FIBER CABLE HAVING CONNECTOR AND ASSEMBLING METHOD THEREOF

(71) Applicants: FUJIKURA, LTD., Koto-ku, Tokyo (JP); NIPPON TELEGRAPH AND TELEPHONE CORPORATION, Chiyoda-ku, Tokyo (JP)

(72) Inventors: Shigeo Takahashi, Sakura (JP); Takashi Yamaguchi, Sakura (JP); Tatsumi Miyazaki, Sakura (JP); Kazuhiro Takizawa, Sakura (JP); Tetsuhiro Numata, Tsukuba (JP); Kazutoshi Takamizawa, Tsukuba (JP); Atsushi Daido, Tsukuba (JP); Tadashi Sasaki, Tsukuba (JP); Hayato Minami, Tsukuba (JP)

(73) Assignees: FUJIKURA, LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/283,402

(22) Filed: May 21, 2014

(65) Prior Publication Data

US 2014/0254989 A1    Sep. 11, 2014

Related U.S. Application Data

(63) Continuation of application No. PCT/JP2012/080492, filed on Nov. 26, 2012.

(30) Foreign Application Priority Data

Nov. 28, 2011  (JP) .................................. 2011-259495

(51) Int. Cl.
  G02B 6/38    (2006.01)

(52) U.S. Cl.
  CPC ............ *G02B 6/3861* (2013.01); *G02B 6/3821* (2013.01); *G02B 6/3887* (2013.01)

(58) Field of Classification Search
  None
  See application file for complete search history.

(56) References Cited

U.S. PATENT DOCUMENTS

| 4,198,119 | A | 4/1980 | Uberbacher |
| 6,565,261 | B1 * | 5/2003 | Uchiyama et al. ............... 385/60 |

(Continued)

FOREIGN PATENT DOCUMENTS

| JP | 60086508 A | 5/1985 |
| JP | 1-167813 A | 7/1989 |

(Continued)

OTHER PUBLICATIONS

Communication dated Sep. 18, 2014, issued by the Taiwan Patent Office in corresponding Taiwanese Application No. 101143924.

(Continued)

*Primary Examiner* — Michelle R Connelly
(74) *Attorney, Agent, or Firm* — Sughrue Mion, PLLC

(57) ABSTRACT

An optical fiber cable having an optical connector, includes: an optical connector assembled on a tip portion of an optical fiber cable, including a ferrule in which an optical fiber protruding from a terminal of the optical fiber cable is inserted and fixed; and a reinforced portion formed by heating and shrinking a heat-shrinkable tube and by solidifying a hot-melt adhesive of an inner portion of the heat-shrinkable tube after melting the hot-melt adhesive so as to integrate a rear end portion of the ferrule, the tip portion of the optical fiber cable which is disposed so as to be separated in a rear side of the ferrule, and the heat-shrinkable tube which accommodates the rear end portion of the ferrule and the tip portion of the optical fiber cable and in which the hot-melt adhesive is disposed in the inner portion of the heat-shrinkable tube.

20 Claims, 8 Drawing Sheets

(56) References Cited

U.S. PATENT DOCUMENTS

| | | | | |
|---|---|---|---|---|
| 8,550,728 B2* | 10/2013 | Takahashi et al. | | 385/99 |
| 8,678,670 B2* | 3/2014 | Takahashi et al. | | 385/80 |
| 2008/0193089 A1* | 8/2008 | Miyamoto et al. | | 385/96 |
| 2010/0158452 A1* | 6/2010 | Takahashi et al. | | 385/96 |
| 2010/0272397 A1 | 10/2010 | Komaki et al. | | |
| 2012/0281951 A1* | 11/2012 | Takahashi et al. | | 385/80 |
| 2014/0105548 A1* | 4/2014 | Takahashi et al. | | 385/78 |

FOREIGN PATENT DOCUMENTS

| | | |
|---|---|---|
| JP | 1167813 A | 7/1989 |
| JP | 2000-241662 A | 9/2000 |
| JP | 2000241662 A | 9/2000 |
| JP | 2009086267 A | 4/2009 |
| JP | 2010-145951 A | 7/2010 |
| JP | 2010224193 A | 10/2010 |
| JP | 2010-256703 A | 11/2010 |
| JP | 2010256703 A | 11/2010 |
| JP | 2011002705 A | 1/2011 |
| JP | 2011-75829 A | 4/2011 |
| JP | 2011075829 A | 4/2011 |
| JP | 2011-107590 A | 6/2011 |
| JP | 2011107590 A | 6/2011 |
| TW | 200944855 A1 | 11/2009 |
| WO | WO 2013080923 A1 * | 6/2013 |

OTHER PUBLICATIONS

"F04 Type Connectors for Optical Fiber Cables (Type SC Connectors)", Japanese Industrial Standards C 5973, 2014, pp. 1-3, 24.

International Search Report of PCT/JP2012/080492, dated Jan. 29, 2013.

Office Action Decision of Rejection of Japanese Patent Application No. 2011-259495, dated Jun. 18, 2013.

Communication dated Feb. 2, 2015 from the State Intellectual Property Office of People's Republic of China in counterpart application No. 201280058548.0.

Communication dated Feb. 5, 2013 from the Japanese Patent Office in counterpart application No. 2011259495.

Communication dated Jan. 6, 2015 from the Japanese Patent Office in counterpart application No. 2013187702.

Communication dated May 26, 2015, issued by the Intellectual Property Office of Saudi Arabia in counterpart Application No. 112340030.

Communication dated Jul. 28, 2015 from the European Patent Office in counterpart application No. 12853670.3.

Communication dated Sep. 21, 2015, issued by the Indonesian Patent Office in corresponding Indonesian Application No. P-00201402548.

* cited by examiner

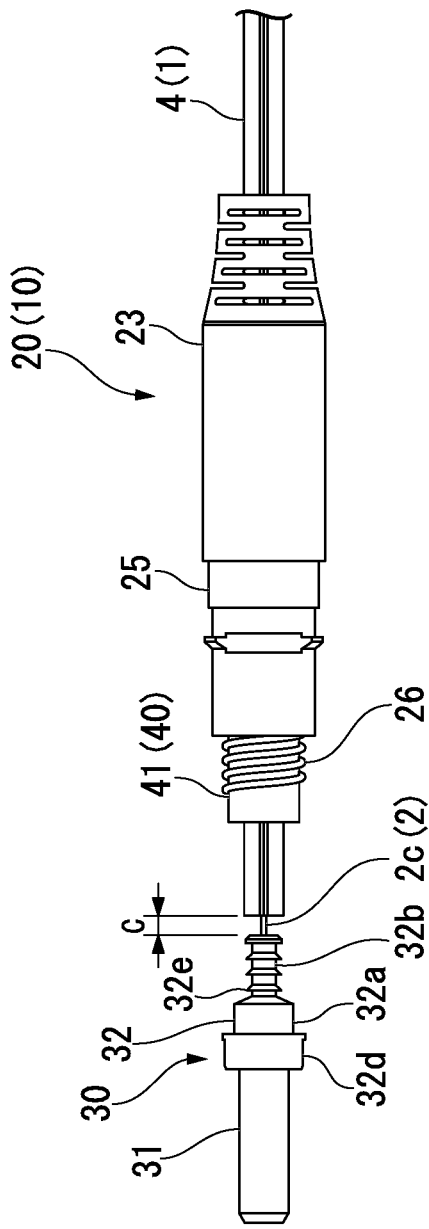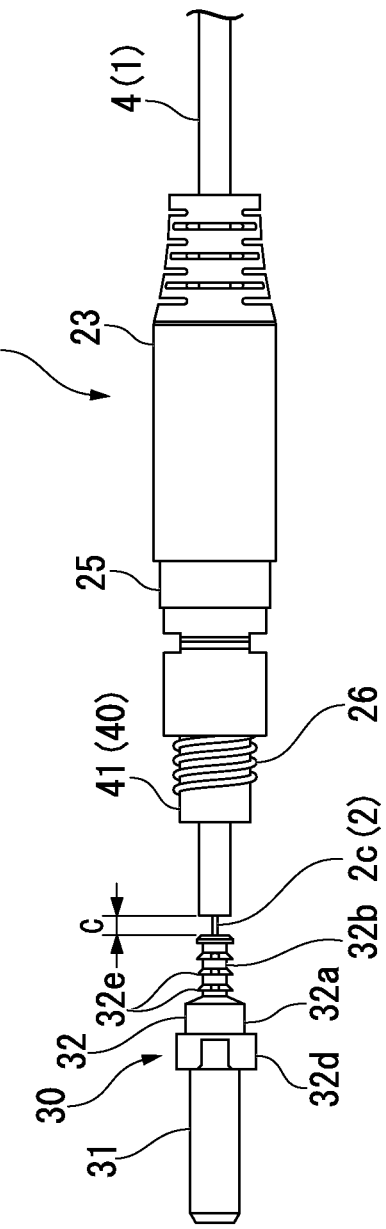

OPTICAL FIBER CABLE HAVING CONNECTOR AND ASSEMBLING METHOD THEREOF

CROSS REFERENCE TO RELATED APPLICATIONS

This application is a continuation application based on a PCT Patent Application No. PCT/JP2012/080492, filed Nov. 26, 2012, whose priority is claimed on Japanese Patent Application No. 2011-259495, filed Nov. 28, 2011, the entire content of which are hereby incorporated by reference.

BACKGROUND OF THE INVENTION

1. Field of the Invention

The present invention relates to an optical fiber cable having a connector in which an optical connector is assembled on the tip portion of the optical fiber cable, and an assembly method thereof (an assembly method of the optical fiber cable having a connector).

2. Description of Related Art

Conventionally, as mounting of an optical connector to a tight buffer type optical fiber cable (hereinafter, also referred to as an "optical fiber cable" or simply as a "cable") which is represented by an indoor optical fiber cable or a drop optical fiber cable, a method which uses a so-called field assembly type optical connector or a method which assembles a factory assembly type optical connector including a ferrule through which an empty fiber hole penetrates is adopted.

The field assembly type optical connector includes a short optical fiber (hereinafter, referred to as a "built-in optical fiber) which is inserted into and fixed to a ferrule in advance. The tip of the optical fiber in which a jacket of a cable terminal is removed and exposed is butted and connected to the rear end opposite to the front end which is positioned in the front end surface (splice end surface) of the ferrule of the built-in optical fiber, and thereby, the field assembly type optical connector is assembled on the tip of the cable (for example, refer to Japanese Unexamined Patent Application, First Publication No. 2010-145951).

After the optical fiber in which the jacket of the cable terminal is removed and exposed is inserted into and fixed to the fiber hole which penetrates through the ferrule, a housing which accommodates the ferrule is assembled, and the factory assembly type optical connector is provided in the cable terminal.

Compared to the case where the factory assembly type optical connector is used, since the assembly of the field assembly type optical connector on the tip portion of the cable has a structure in which the connecting points between the optical fibers further increases by one and the connecting points are accommodated in the inner portion of the connector, the entire length of the connector is lengthened, and thereby, there are disadvantages in which the structure of the connector is complicated, the costs increases, and the like. In addition, since the field assembly type optical connector includes anchoring means for anchoring the jacket terminal of the cable, the configuration also becomes complicated and the costs increases.

On the other hand, in the factory assembly type optical connector, since it is not necessary to accommodate the connecting points between the optical fibers and the configuration is simpler compared to the field assembly type optical connector, the costs are decreased. However, in a case where the factory assembly type optical connector is assembled on the tip portion of the cable, a portion which extends between the ferrule and the tip of the cable jacket is present in the optical fiber of the optical fiber cable, and there is a problem in that the mechanical strength of the portion is decreased.

SUMMARY OF THE INVENTION

The present invention is made in consideration of the above-described circumstances, and an object thereof is to provide an optical fiber cable having a connector and an assembly method of the optical fiber cable having a connector capable of suppressing the entire length of a connector with a simple structure and of easily securing mechanical strength between a ferrule and the optical fiber cable at a low cost.

In order to solve the above-described problems, the present invention provides the following configurations.

A first aspect of the present invention includes, an optical fiber cable having an optical connector, including: an optical connector assembled on a tip portion of an optical fiber cable, including a ferrule in which an optical fiber protruding from a terminal of the optical fiber cable is inserted and fixed; and a reinforced portion formed by heating and shrinking a heat-shrinkable tube and by solidifying a hot-melt adhesive of an inner portion of the heat-shrinkable tube after melting the hot-melt adhesive so as to integrate a rear end portion of the ferrule, the tip portion of the optical fiber cable which is disposed so as to be separated in a rear side of the ferrule, and the heat-shrinkable tube which accommodates the rear end portion of the ferrule and the tip portion of the optical fiber cable and in which the hot-melt adhesive is disposed in the inner portion of the heat-shrinkable tube.

A second aspect of the present invention includes, in the first aspect, a protrusion portion formed in the rear end portion of the ferrule, increasing pull-out resistance of the heat-shrinkable tube.

A third aspect of the present invention includes, in the first or the second aspect, tensile strength fibers disposed inside the heat-shrinkable tube or embedded to the heat-shrinkable tube, substantially equally disposed in a plurality of locations in a circumferential direction of the heat-shrinkable tube, extending along an axis line direction of the heat-shrinkable tube.

A fourth aspect of the present invention includes, an assembly method of an optical fiber cable having a connector, including: a step of inserting and fixing an optical fiber protruding from a terminal of an optical fiber cable into a ferrule; a step of accommodating a rear end portion of an inserted and fixed ferrule and a tip portion of the optical fiber cable which is disposed so as to be separated in a rear side of the ferrule into a heat-shrinkable tube in which a hot-melt adhesive is disposed in an inner portion of the heat-shrinkable tube in advance, and a step of forming a reinforced portion, integrating a rear end portion of the ferrule, the tip portion of the optical fiber cable, and the heat-shrinkable tube by heating and shrinking an accommodating heat-shrinkable tube and by solidifying the hot-melt adhesive in the heat-shrinkable tube after melting the hot-melt adhesive.

A fifth aspect of the present invention includes, in the fourth aspect, using a ferrule in which a protrusion portion which increases pull-out resistance of the heat-shrinkable tube, and the protrusion portion is formed in the rear end portion of the ferrule.

A sixth aspect of the present invention includes, in the fifth aspect, the assembly method further include: the heat-shrinkable tube is used in which tensile strength fibers extending along an axis line direction of the heat-shrinkable tube are disposed inside the heat-shrinkable tube or embedded to the heat-shrinkable tube, the tensile strength fibers are substantially equally disposed in a plurality of locations in a circumferential direction of the heat-shrinkable tube; the rear end portion of the ferrule and the tip portion of the optical fiber cable are accommodated inside the heat-shrinkable tube so that the tensile strength fibers are disposed at a periphery of the rear end portion of the ferrule and the tip portion of the optical fiber cable; and the heat-shrinkable tube is heated and shrunk.

A seventh aspect of the present invention includes, in any one of the fourth to sixth aspects, the assembly method further include: the heat-shrinkable tube is used in which the hot-melt adhesive is provided in a ring shape along an inner surface of a center portion in a longitudinal direction of the heat-shrinkable tube; the rear end portion of the ferrule and the tip portion of the optical fiber cable are accommodated inside the hot-melt adhesive; and the heat-shrinkable tube is heated and shrunk.

According to the present invention, since the reinforced portion which is provided in the optical connector assembled on the terminal of the optical fiber cable has the configuration in which the rear end portion of the ferrule, the tip portion of the optical fiber cable, and the heat-shrinkable tube are integrated, mechanical strength between the rear end portion of the ferrule and the tip portion of the optical fiber cable can be easily secured. The structure of the reinforced portion is simple, and the reinforced portion can be simply assembled at a low cost.

Moreover, since a decrease in the size of the reinforced portion is easily achieved, an influence on the size of the connector can be avoided.

In addition, since the optical connector has the structure in which the optical fiber protruding from the terminal of the optical fiber cable is directly inserted into the ferrule and fixed, it is not necessary to accommodate connecting points of the optical fiber. In the optical connector, since anchoring means for anchoring the optical fiber cable is not required, the structure is simpler compared to a field assembly type optical connector having a configuration which accommodates connecting points in which optical fibers are butted and connected, and thereby, the entire length of the connector can be suppressed, and a decrease in the costs can be easily achieved.

BRIEF DESCRIPTION OF THE DRAWINGS

FIGS. 4A and 4B are views illustrating a mounting step of the ferrule in an assembly method of the optical fiber cable having a connector of an embodiment according to the present invention.

DETAILED DESCRIPTION OF THE INVENTION

Hereinafter, an embodiment of the present invention will be described with reference to the drawings.

Figure 1:
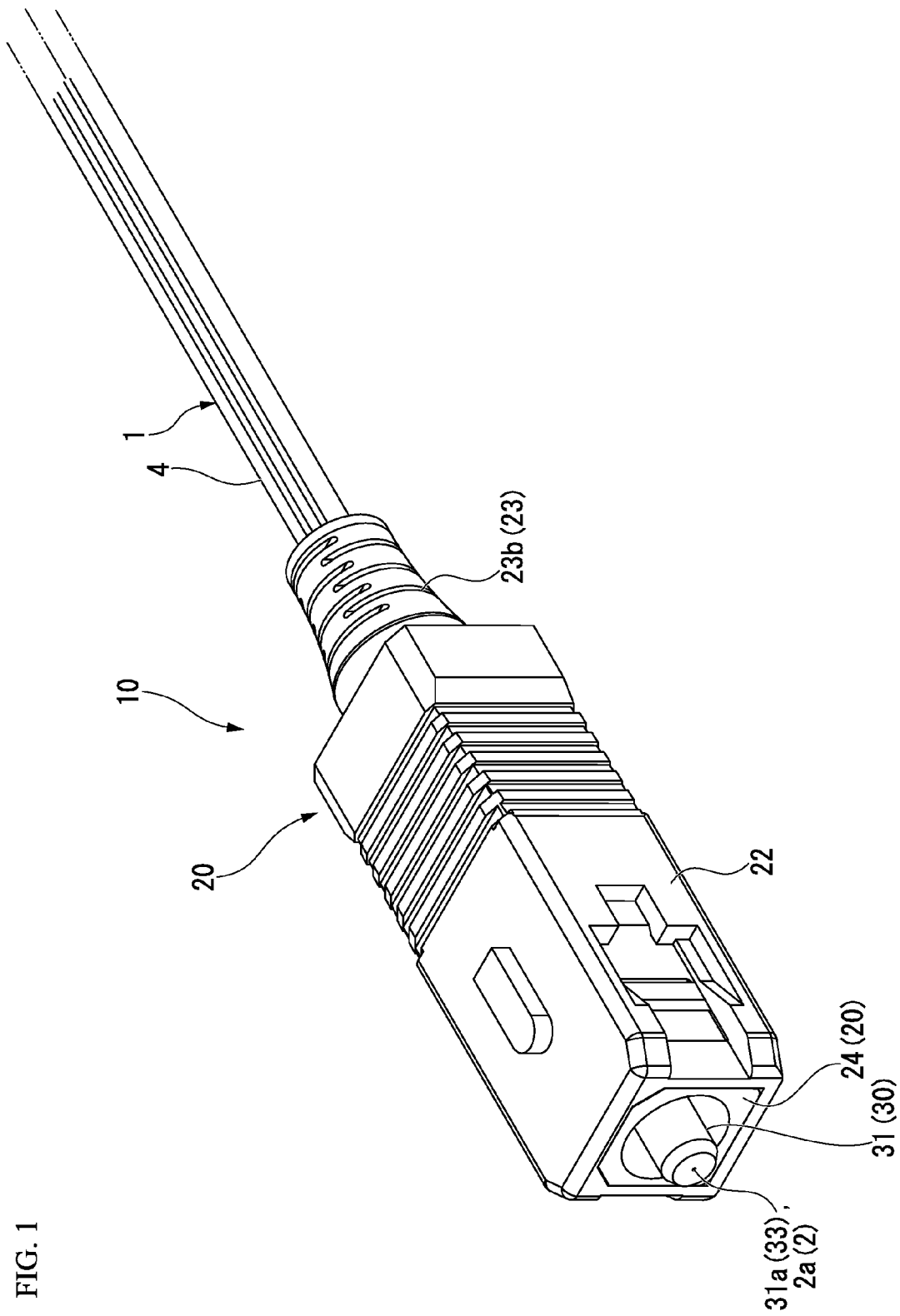
FIG. 1 is a perspective view showing a structure located near an optical connector of an optical fiber cable having a connector of a first embodiment of the present invention.
Figure 2:
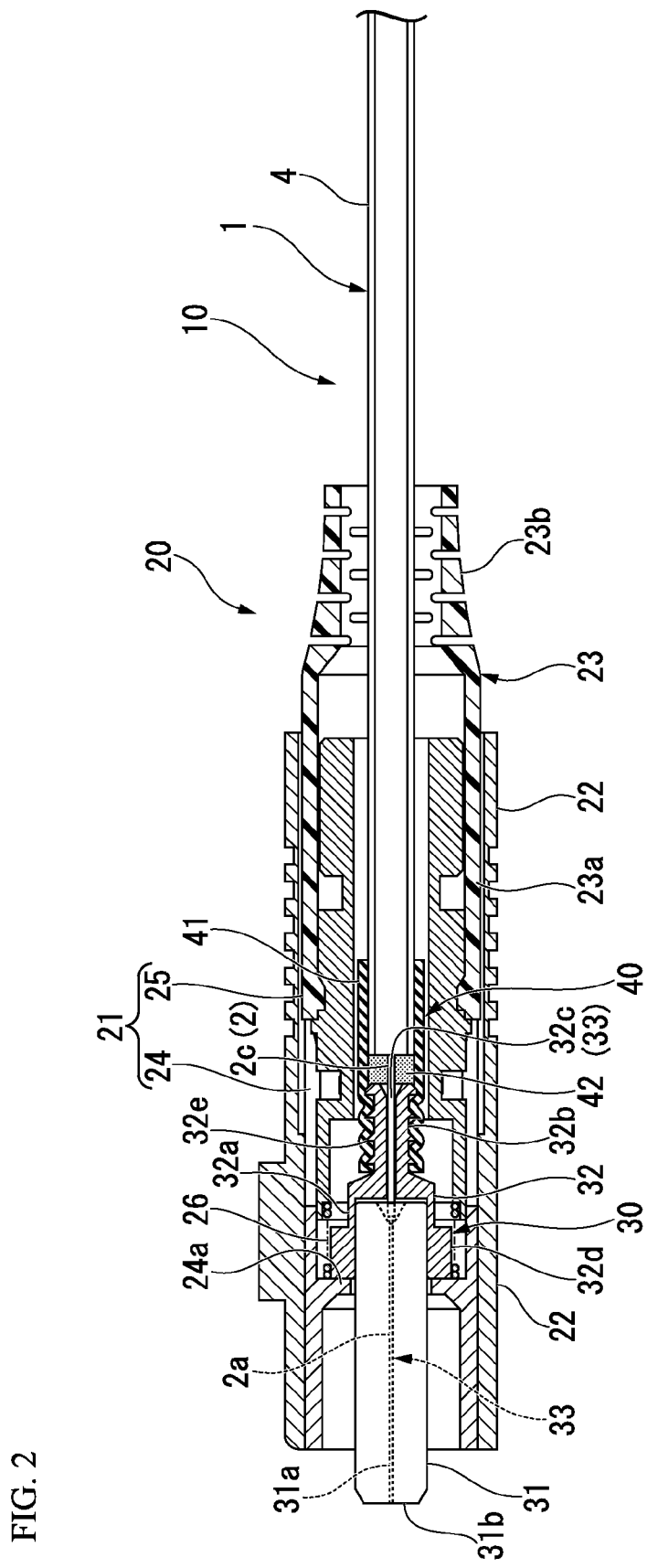
FIG. 2 is a cross-sectional view showing the structure of the optical connector of FIG. 1.
Figure 3:
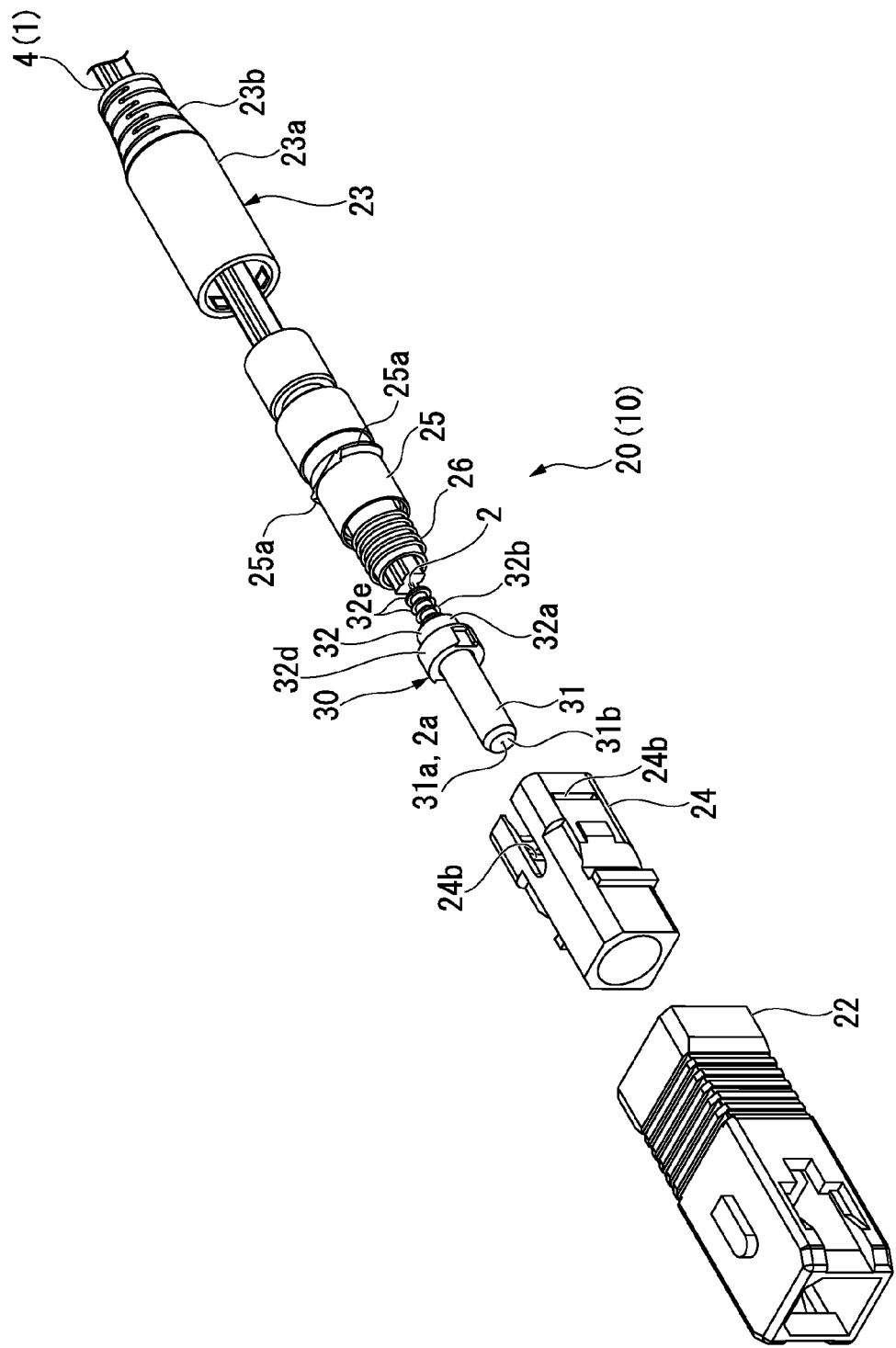
FIG. 3 is an exploded perspective view showing the structure of the optical connector of FIG. 1.

As shown in FIGS. 1 to 3, in an optical fiber cable 10 with a connector of the embodiment described herein, an optical connector 20 is assembled on the tip portion of an optical fiber cable 1.

Figure 10:
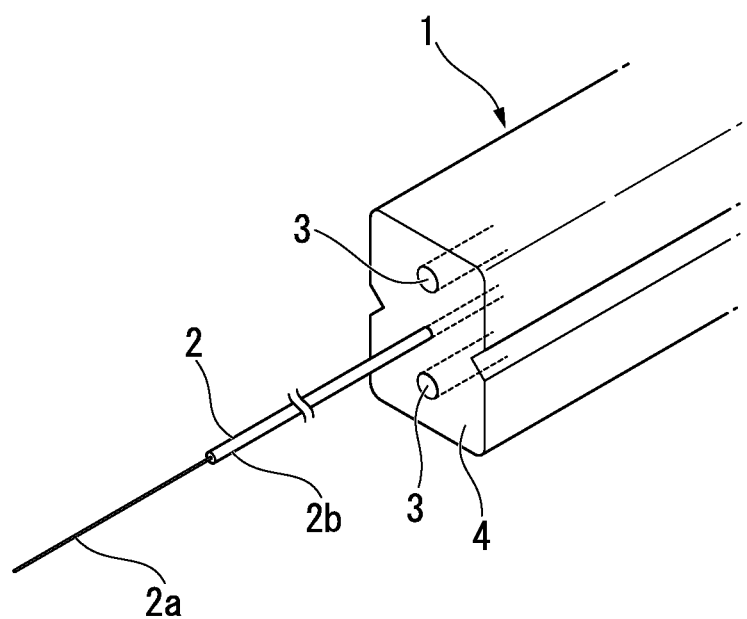
FIG. 10 is a perspective view showing the structure of an optical fiber cable of the optical fiber cable having the connector of FIG. 1.

As shown in FIG. 10, the optical fiber cable 1 is a tight buffer type optical fiber cable and is configured by collectively coating an optical fiber 2 and flexible linear tensile strength bodies 3 so as to be parallel to each other using a jacket 4 made of synthetic resin.

For example, as the tensile strength bodies 3, there may be the strength body which is formed of tensile strength fibers such as an aramid fiber, a steel wire, or the like. The tensile strength bodies 3 are disposed so as to extend along the optical fiber 2 in both sides of the optical fiber 2.

The optical fiber 2 is an optical fiber with a coating having a configuration in which the outer circumferential surface (side surface) of a bare optical fiber 2a is covered with a coating 2b. For example, as the optical fiber 2, there may be an optical fiber core, an optical fiber wire, or the like. For example, the bare optical fiber 2a is a quartz-based optical fiber. In addition, for example, the coating 2b is a resin coating in which ultraviolet-curable resin, polyamide resin, or the like is substantially concentrically coated in a single layer or a plurality of layers.

As the optical fiber cable 1, there may be an indoor cable, a drop cable, or the like.

As shown in FIGS. 2 and 3, a ferrule 30 to which the optical fiber 2 protruding from the terminal of the optical fiber cable 1 is inserted and fixed is accommodated in a sleeve-shaped housing 21, and thereby, the optical connector 20 is schematically configured.

Specifically, the optical connector 20 of the shown example is assembled using a housing 21, a knob 22 (coupling), and a boot 23 of a SC type optical connector (SC: Single-fiber Coupling optical fiber connector and an F04 type optical connector which is defined in JISC 5973). Moreover, the optical connector 20 includes a spring 26 which elastically biases the ferrule 30 to the front side of the connector (left side in FIG. 2) in the housing 21.

The housing 21 is assembled by fitting (fitting into) the front end portion of a sleeve-shaped stop ring 25 to the rear end portion of a plug frame 24 which configures the front side portion of the housing. The plug frame 24 of the optical connector 20 of the shown example is formed in an angled tubular shape, and the stop ring 25 is formed in a cylindrical shape.

The knob 22 is an angled tubular shape and is externally inserted to the housing 21, and the knob secures a slightly movable range in the axis line direction of the housing 21 and is slidably assembled.

The ferrule 30 is a ferrule for a single-core optical connector (here, a SC type optical connector) and has a configuration in which a sleeve-shaped flange part 32 is fixed to a capillary shape ferrule main body 31.

For example, as a material for forming the ferrule main body 31, ceramic such as zirconia, or glass may be adopted. Moreover, in the ferrule main body 31, a fiber hole 31a which is a micropore is provided so as be penetrated, and the fiber hole coaxially extends to the center axis line of the ferrule main body 31 having a cylindrical shape.

For example, as shown in FIGS. 2 to 4B, the flange part 32 is an integral molded part made of metal. However, the flange part is not limited to the part made of metal, and for example, the flange part may adopt a hard plastic part or the like. The flange part 32 includes a fixing ring portion 32a that is externally inserted to and fixed to the rear end portion opposite to a splice end surface 31b of the front end of the ferrule main body 31, and a sleeve portion 32b that extends from the fixing ring portion 32a to the rear side (the side opposite to the splice end surface 31b of the ferrule main body 31). The sleeve portion 32b is formed in a tubular shape that includes an inner hole 32c that is coaxial with the fixing ring portion 32a. Moreover, a flange portion 32d that protrudes over the entire outer circumference is circumferentially provided in the front end portion (the end portion opposite to the sleeve portion 32b) of the fixing ring portion 32a.

The flange portion 32d functions as a flange portion of the ferrule 30.

As shown in FIG. 2, the optical fiber 2 that protrudes from the terminal (tip) of the optical fiber cable 1, specifically, the bare optical fiber 2a which is led out at the tip portion of the optical fiber 2 is inserted into and fixed to the fiber hole 31a of the ferrule main body 31, and the portion (coated portion) which is covered with the coating 2b of the optical fiber 2 is inserted into and fixed to the inner hole 32c of the sleeve portion 32b of the flange part 32. For example, the optical fiber 2 is bonded and fixed to the ferrule 30 by adhesive that is filled in the fiber hole 31a and the inner hole 32c of the ferrule 30. The optical fiber 2 is inserted into and fixed to a fiber inner insertion hole 33 of the ferrule 30 that includes the fiber hole 31a and the inner hole 32c.

In addition, grinding is performed on the splice end surface 31b of the ferrule main body 31. The tip (front end) surface of the bare optical fiber 2a of the optical fiber 2 is aligned with the splice end surface 31b of the ferrule main body 31. The tip surface of the bare optical fiber 2a is ground at the surface that is continuous to the splice end surface 31b of the ferrule main body 31.

The boot 23 of the optical connector 20 includes a sleeve-shaped mounting portion 23a that is assembled to the circumference of the stop ring 25 and a tapered tubular portion 23b having flexibility that extends from the front side sleeve portion 23a to the rear side (the side opposite to the plug frame 24) of the stop ring 25. The tapered tubular portion 23b is formed in a shape which is gradually tapered from the front side sleeve portion 23a to the rear side.

The optical fiber cable 1 is drawn inside the tapered tubular portion 23b of the boot 23 and is drawn into the housing 21 of the optical connector 20. The tip portion of the optical fiber cable 1 is disposed so as to be separated from the ferrule 30 (specifically, the rear end of the sleeve portion 32b of the flange part 32) to the rear side.

As shown in FIG. 2, the optical connector 20 includes the sleeve portion 32b of the flange part 32 of the ferrule 30, the tip portion of the optical fiber cable 1, a heat-shrinkable tube 41 that accommodates the sleeve portion and the tip portion, and a reinforced portion 40 that is integrated by adhesive 42 filled in the inner portion of the heat-shrinkable tube 41 in the housing 21.

In the heat-shrinkable tube 41, one end portion in the axis line direction is externally inserted to and fixed to the sleeve portion 32b of the flange part 32 of the ferrule 30 (hereinafter, also referred to as a rear side sleeve portion 32b of the ferrule 30), and the other end portion in the axis line direction is provided so as to be externally inserted to and fixed to the tip portion of the optical fiber cable 1.

A protrusion portion 32e that increases pull-out resistance of the heat-shrinkable tube 41 protrudes into the circumference in the sleeve portion 32b of the flange part 32 of the ferrule 30. The protrusion portion 32e that is exemplified in FIGS. 2 to 4B is formed in a flange shape which extends along the circumferential direction of the outer circumference of the sleeve portion 32b. In addition, the protrusion portions 32e are formed in a plurality of locations in the axis line direction of the sleeve portion 32b.

The heat-shrinkable tube 41 that is externally inserted to and fixed to the rear side sleeve portion 32b of the ferrule 30 is formed in an uneven shape according to the uneven shape due to the presence of the protrusion portion 32e on the outer circumference of the sleeve portion 32b, and comes into press-contact with the outer circumference of the sleeve portion 32b. Thereby, the heat-shrinkable tube 41 that is externally inserted to and fixed to the rear side sleeve portion 32b of the ferrule 30 increases removing force in the axis line direction from the sleeve portion 32b, and the positional deviation in the axis line direction with respect to the sleeve portion 32b is prevented.

The adhesive 42 (specifically, the resin that is generated due to solidification of the adhesive 42) is filled between the rear side sleeve portion 32b of the ferrule 30 (the rear end portion of the ferrule 30) and the tip position of the optical fiber cable 1 that is disposed so as to be separated from the rear side of the sleeve portion 32b. In the optical fiber 2 that protrudes from the optical fiber cable 1, a portion (hereinafter, also referred to as an "intermediate extension portion 2c") that extends between the ferrule 30 and the optical fiber cable 1 (coating portion that is coated by the jacket 4) is embedded to the adhesive 42 and integrated.

As the adhesive 42, a hot-melt adhesive that includes a hot-melt resin may be appropriately used. In this embodiment, the hot-melt adhesive that includes the hot-melt resin is used as the adhesive 42.

For example, as the hot-melt resin, there may be ethylene-vinyl acetate copolymer (EVA), polyethylene, polyisobutylene, polyamide, an ethylene-acrylate acid ester copolymer, or the like.

For example, in the configuration in which the intermediate extension portion 2c of the optical fiber 2 of the optical fiber cable 1 is embedded in the resin that is generated due to the solidification of the adhesive 42 and is integrated, it is possible to prevent external force such as a pulling force which acts from the portion extending from the optical connector 20 of the optical fiber cable 1 to the rear side or a displacement force generated due to push back of the ferrule 30 at the time of the fitting of the connector from intensively acting on the intermediate extension portion 2c. As a result, buckling, breaking, or the like of the intermediate extension portion 2c does not easily occur, and there is an advantage in that the mechanical durability can be improved.

Moreover, in this configuration, some deformation can be applied to the resin in which the intermediate extension portion 2c is embedded and integrated. Thereby, for example, when bending stress is applied to the reinforced portion 40 due to side pull (pulling in the direction along a virtual perpendicular surface which is perpendicular to the axis line of the housing 21 of the optical connector 20) or the like with respect to the optical connector 20 of the optical fiber cable 1, the reinforced portion 40 is appropriately deformed elastically. Thereby, rupture of the housing 21 due to local stress concentration can be prevented.

The spring 26 of the optical connector 20 is externally inserted to the reinforced portion 40, and is interposed between the front end of the stop ring 25 and the flange portion 32d of the ferrule 30.

The flange portion 32d of the ferrule 30 abuts a stopper protrusion 24a, which is provided so as to protrude in the inner surface of the plug frame 24, from the rear side (right side in FIG. 2) due to the elastic biasing force of the spring 26. The ferrule 30 resists the elastic biasing force of the spring 26 from the position in which the flange portion 32d abuts the stopper protrusion 24a of the plug frame 24 and can be pushed (pushed back) to the rear side of the connector.

The position in which the flange portion 32d abuts the stopper protrusion 24a of the plug frame 24 becomes a forward movement limit position of the ferrule 30 with respect to the housing 21.

Figure 5:
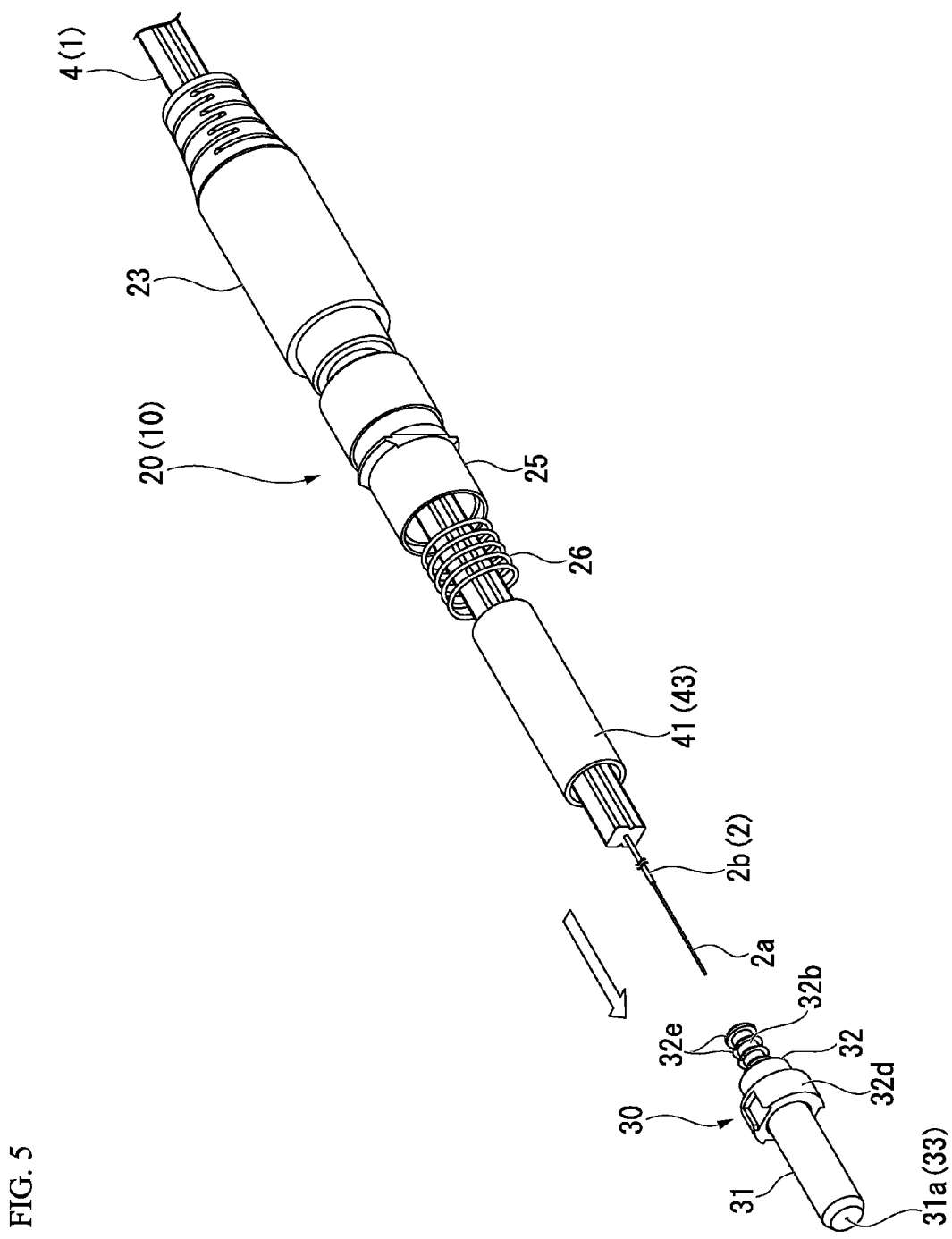
FIG. 5 is a view illustrating a mounting step of the ferrule in the assembly method of the optical fiber cable having the connector of the embodiment according to the present invention.

First, as shown in FIG. 5, in the assembly of the optical fiber cable 10 with the connector (the assembly method of the optical fiber cable having the connector), a ferrule mounting step in which the ferrule 30 is mounted on the tip portion of the optical fiber 2 that protrudes from the terminal of the optical fiber cable 1 is performed. In the ferrule mounting step, the optical fiber 2 is inserted into the fiber inner insertion hole 33 of the ferrule 30 and is fixed to the ferrule 30 by bonding and fixing, or the like.

As shown in FIGS. 4A and 4B, the tip portion of the optical fiber cable 1 is disposed so as to be separated from the ferrule 30 (specifically, the rear end of the sleeve portion 32b of the flange part 32) to the rear side. Since the protrusion length of the optical fiber 2 that protrudes from the terminal of the optical fiber cable 1 secures a length that is longer than the entire length of the fiber inner insertion hole 33 of the ferrule 30, the optical fiber cable 1 can be disposed at the position that is separated from the rear end of the ferrule 30 to the rear side. It is preferable to secure a separation distance C of 1 mm or more between the tip portion of the optical fiber cable 1 and the rear end of the ferrule 30.

Moreover, the stop ring 25, the boot 23, the spring 26, and the heat-shrinkable tube 43 with adhesive (described below), which are used in the assembly of the optical connector 20 in the ferrule mounting step, are externally inserted to the optical fiber cable 1, and are disposed at the position that is separated from the tip portion of the optical fiber cable 1 so as not to interfere with the work.

However, in a step after the ferrule mounting step, the stop ring 25, the boot 23, the spring 26, and the heat-shrinkable tube 43 with the adhesive (described below) are externally inserted from the end portion (rear end portion) opposite to the tip portion of the optical fiber cable 1 to the optical fiber cable 1 sequentially, and may be used in the assembly of the optical connector 20.

If the ferrule mounting step has been completed, subsequently, the rear side sleeve portion 32b of the ferrule 30 and the tip portion of the optical fiber cable 1 are accommodated inside the heat-shrinkable tube 41, and the step of forming the reinforced portion 40 (reinforced portion-forming step) is performed.

Figure 6:
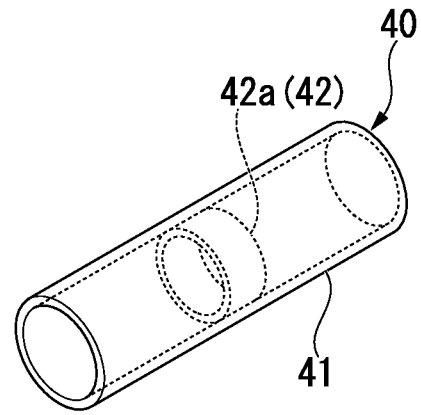
FIG. 6 is a perspective view showing an example of a heat-shrinkable tube with adhesive which is used in a reinforced portion-forming step in the assembly method of the optical fiber cable having the connector of the embodiment according to the present invention.

As shown in FIG. 6, in the reinforced portion-forming step (the step of forming the reinforced portion), the heat-shrinkable tube 43 with the adhesive in which the hot-melt adhesive 42 is provided in a ring shape is used along the inner surface of the center portion in the longitudinal direction of the cylindrical heat-shrinkable tube 41. The hot-melt adhesive 42 is coated with the inner surface of the heat-shrinkable tube 41 of the hot-melt resin which is heated and melted, or the hot-melt resin is fitted inside the heat-shrinkable tube 41 in advance which is a resin ring formed in a ring shape, and the hot-melt adhesive is provided in the heat-shrinkable tube 41 by thermal welding, the bonding and fixing using separate adhesive, or the like. Hereinafter, the hot-melt adhesive 42, which provided in a ring shape along the inner surface in the heat-shrinkable tube 41, is also referred to as a ring-shaped adhesive layer 42a.

As the heat-shrinkable tube 41, a tube which includes a heat shrinkage resin is used, and for example, a polyolefin which shrinks at 100 to 160° C., or the like may be used.

As the hot-melt adhesive 42, adhesive which is melted at the shrinkage temperature of the heat-shrinkable tube 41 is used. For example, the melting temperature is 100 to 160° C.

Figure 7:
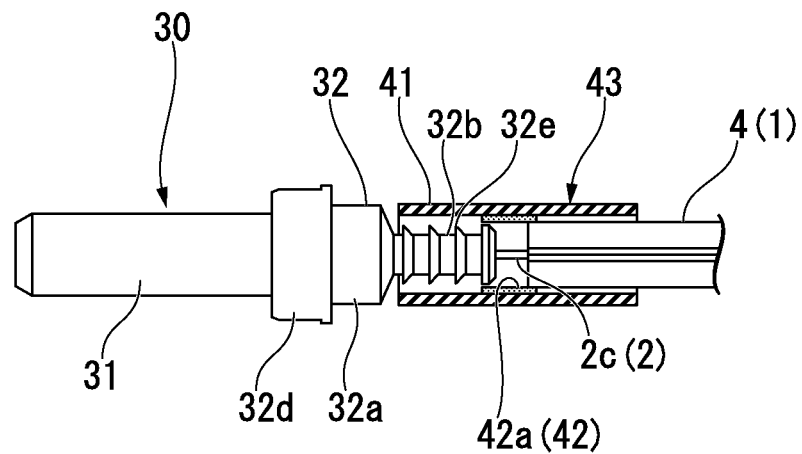
FIG. 7 is a view illustrating the reinforced portion-forming step in the assembly method of the optical fiber cable having the connector of the embodiment according to the present invention.

In the reinforced portion-forming step, the heat-shrinkable tube 43 with the adhesive which is externally inserted to the optical fiber cable 1 is moved in the longitudinal direction of the optical fiber cable 1, and as shown in FIG. 7, the heat-shrinkable tube 43 with the adhesive is coated (externally inserted) between the rear side sleeve portion 32b of the ferrule 30 and the tip portion of the optical fiber cable 1. In addition, at this time, the heat-shrinkable tube 43 with the adhesive is disposed so that the ring-shaped adhesive layer 42a coats the entire intermediate extension portion 2c. The heat-shrinkable tube 43 with the adhesive uses a tube that includes the ring-shaped adhesive layer 42a that is formed in the size capable of covering the entire intermediate extension portion 2c.

In the ring-shaped adhesive layer 42a of the heat-shrinkable tube 43 with the adhesive of the example shown in FIG. 7, the length of the ring-shaped adhesive layer 42a in the axis line direction of the heat-shrinkable tube 41 is formed so as to be slightly longer compared to the length in the axis line direction of the intermediate extension portion 2c, and is formed so as to be shorter compared to the length in the axis line direction of the heat-shrinkable tube 41. The heat-shrinkable tube 41 includes the inner surface, which is not covered with the ring-shaped adhesive layer 42, in both sides via the ring-shaped adhesive layer 42a which is formed only in the center portion in the axis line direction.

Subsequently, in the reinforced portion-forming step, the heat-shrinkable tube 43 with the adhesive is heated to a temperature which is equal to or more than the shrinkage temperature of the heat-shrinkable tube 41. Thereby, the heat-shrinkable tube 41 is shrunk and the hot-melt adhesive 42 which is melted is embedded between the rear side sleeve portion 32b of the ferrule 30 and the tip portion of the optical fiber cable 1. The intermediate extension portion 2c of the optical fiber 2 of the optical fiber cable 1 is embedded into the hot-melt adhesive 42.

Subsequently, the temperature of the heat-shrinkable tube 43 with the adhesive is decreased to the temperature which is lower than the melting temperature of the hot-melt adhesive 42 by air cooling or the like, and the hot-melt adhesive 42 is solidified. Thereby, the rear side sleeve portion 32b of the ferrule 30, the tip portion of the optical fiber cable 1, and the heat-shrinkable tube 41 are firmly adhered by the hot-melt adhesive 42 and are integrated, and the reinforced portion 40 can be formed. The reinforced portion-forming step is completed according to the formation of the reinforced portion 40. In addition, in the formed reinforced portion 40, the intermediate extension portion 2c of the optical fiber 2 of the optical fiber cable 1 is also integrated by the hot-melt adhesive 42.

The heat-shrinkable tube 41 becomes pressure-bonded to both of the rear side sleeve portion 32b of the ferrule 30 and the tip portion of the optical fiber cable 1 due to the heating and shrinkage.

Moreover, in the reinforced forming step, for example, liquid adhesive such as epoxy-based adhesive is coated with the inner surface of the portion of the heat-shrinkable tube 43 with the adhesive which is externally inserted to the rear side sleeve portion 32b of the ferrule 30 and the inner surface of the portion of the heat-shrinkable tube 43 with the adhesive which is externally inserted to the tip portion of the optical fiber cable 1, and the heat-shrinkable tube 43 with the adhesive may be used. The liquid adhesive is coated with the inner surfaces of both sides (the inner surfaces which are not coated with the ring-shaped adhesive layer 42a) via the ring-shaped adhesive layer 42a of the center portion in the longitudinal direction of the heat-shrinkable tube 41. Thereby, the fixing force of the heat-shrinkable tube 41 with respect to the rear side sleeve portion 32b of the ferrule 30 and the tip portion of the optical fiber cable 1 can increase.

As exemplified in FIG. 7, in the reinforced portion-forming step, from the viewpoints of the shape stabilization of the reinforced portion 40, it is preferable that the heat-shrinkable tube 43 with the adhesive be heated in a state where one side near (both end portions in the axis line direction) the end surfaces of both ends in the axis line direction of the ring-shaped adhesive layer 42a is externally inserted to the rear side sleeve portion 32b of the ferrule 30 and the other side is externally inserted to the tip portion of the optical fiber cable 1.

For example, the heat-shrinkable tube 43 with the adhesive is disposed in a state where the ring-shaped adhesive layer 42a is externally inserted only to the intermediate extension portion 2c and may be heated. However, compared to the state where the ring-shaped adhesive layer 42a is externally inserted only to the intermediate extension portion 2c, in the case where the heat-shrinkable tube 43 with the adhesive is disposed with respect to the rear side sleeve portion 32b of the ferrule 30 and the tip portion of the optical fiber cable 1 of FIG. 7, it is possible to stabilize the shape of the reinforced portion 40 which is formed by the heating of the heat-shrinkable tube 43 with the adhesive. In addition, as exemplified in FIG. 7, from the viewpoints of the shape stabilization of the reinforced portion 40, it is preferable that the heat-shrinkable tube 43 with the adhesive be heated in a state where one end portion in the axis line direction of the ring-shaped adhesive layer 42a is externally inserted to the rear end portion of the rear side sleeve portion 32b of the ferrule 30 and the other end portion is externally inserted to the near tip surface of the jacket 4 of the optical fiber cable 1.

The cause of this needs further verification. However, a deaeration property from the inner side of the heat-shrinkable tube 41 according to the heating and shrinkage of the heat-shrinkable tube 41 is assumed as one cause.

In the case where the ring-shaped adhesive layer 42a is externally inserted only to the intermediate extension portion 2c, when the heat-shrinkable tube 43 with the adhesive is heated and the heat-shrinkable tube 41 is shrunk, the shrinkage of the portion of the heat-shrinkable tube 41 which is externally inserted to the intermediate extension portion 2c progresses even after the heat-shrinkable tube 41 becomes pressure-bonded to the rear side sleeve portion 32b of the ferrule 30 and the tip portion of the optical fiber cable 1. If the heat-shrinkable tube 41 comes into press-contact with the rear side sleeve portion 32b of the ferrule 30 and the tip portion of the optical fiber 1, the deaeration property from the inner portion of the heat-shrinkable tube 41 is decreased. Thereby, thereafter, if the shrinkage of the portion of the heat-shrinkable tube 41 which is externally inserted to the intermediate extension portion 2c progresses, a phenomenon occurs in which air that reaches a high pressure inside the heat-shrinkable tube 41 partially expands and moves the heat-shrinkable tube 41 forcibly. Moreover, it is considered that the phenomenon is one of the causes which makes the shape of the reinforced portion 40 be unstable.

In contrast, in the case of the disposition of FIG. 7, when the heat-shrinkable tube 43 with the adhesive is heated and the heat-shrinkable tube 41 is shrunk, as much of the distance from the rear side sleeve portion 32b of the ferrule 30 and the tip portion of the optical fiber cable 1 to the heat-shrinkable tube 41 increases, the shrinkage of the portion of the heat-shrinkable tube 41 which is externally inserted to the intermediate extension portion 2c progresses to some extent before the heat-shrinkable tuber 41 comes into press-contact with the rear side sleeve portion 32b of the ferrule 30 and the tip portion of the optical fiber cable 1. Compared to the case where the ring-shaped adhesive layer 42a is externally inserted only to the intermediate extension portion 2c, when the heat-shrinkable tuber 41 comes into press-contact with the rear side sleeve portion 32b of the ferrule 30 and the tip portion of the optical fiber cable 1, the shrinkage of the portion of the heat-shrinkable tube 41 which is externally inserted to the intermediate extension portion 2c greatly progresses. Thereby, in the case of the disposition of FIG. 7, before the heat-shrinkable tube 41 comes into press-contact with the rear side sleeve portion 32b of the ferrule 30 and the tip portion of the optical fiber cable 1, the air inside the portion has been pushed to some extent already due to the shrinkage of the portion of the heat-shrinkable tube 41 which is externally inserted to the intermediate extension portion 2c. Therefore, in the case of the disposition of FIG. 7, compared to the case where the ring-shaped adhesive layer 42a is externally inserted only to the intermediate extension portion 2c, occurrence of the phenomenon in which the air that reaches a high pressure inside the heat-shrinkable tube 41 partially expands and moves the heat-shrinkable tube 41 forcibly is suppressed, and it is considered that the stabilization of the shape of the reinforced portion 40 can increase.

The heating of the overall heat-shrinkable tube 43 with the adhesive can be equally performed. However, for example, the heating may use a heating plate 50 exemplified in FIG. 8.

Figure 8:
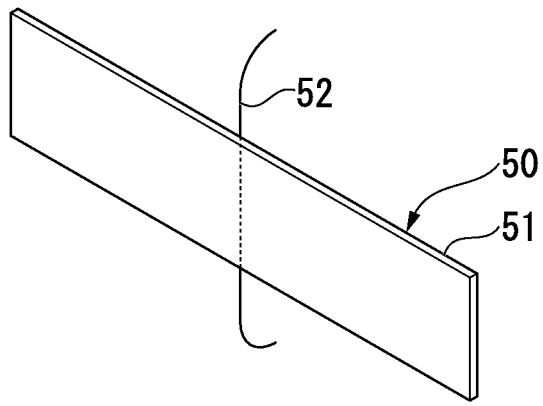
FIG. 8 is a perspective view showing an example of a heating plate which is used in a reinforced portion-forming step in the assembly method of the optical fiber cable having the connector of the embodiment according to the present invention.

In the heating plate 50 exemplified in FIG. 8, an electrically-heated wire 52 is mounted along the width direction perpendicular to the longitudinal direction of the side surface in the center portion in the longitudinal direction of the side surface of an elongate plate-shaped metal plate 51. An electric current flows to the electrically-heated wire 52 and the metal plate 51 is heated, and thereby, the heating plate 50 can propagate the heat from the center portion in the longitudinal direction of the metal plate 51 toward the both ends in the longitudinal direction.

In the heating of the heat-shrinkable tube 43 with the adhesive using the heating plate 50, the longitudinal direction of the metal plate 51 is arranged in the axis line direction (longitudinal direction) of the elongated heat-shrinkable tube 41, and the surface opposite to the rear surface on which the electrically-heated wire 52 of the metal plate 51 is disposed abuts the outer circumferential surface of the heat-shrinkable tube 41. Moreover, in the heating plate 50, when the surface of the metal plate 51 abuts the outer circumferential surface of the heat-shrinkable tube 41, the disposed position of the electrically-heated wire 52 of the center portion in the longitudinal direction of the metal plate 51 is positioned in the center portion in the axial direction of the portion of the heat-shrinkable tube 41 which is externally inserted to the intermediate extension portion 2c. Thereby, due to the fact that an electric current flows to the electrically-heated wire 52 and the metal plate 51 is heated, the heating of the heat-shrinkable tube 43 with the adhesive progresses from the center portion in the axis line direction of the portion of the heat-shrinkable tube 41 which is externally inserted to the intermediate extension portion 2c toward both ends in the axis line direction. As a result, melting of the ring-shaped adhesive layer 42a and the shrinkage of the heat-shrinkable tube 41 progresses from the center portion in the axis line direction of the portion of the heat-shrinkable tube 41 which is externally inserted to the intermediate extension portion 2c toward both ends in the axis line direction, which effectively contributes to a smooth discharge of the air from the inner side of the heat-shrinkable tube 41.

The heating plate 50 exemplified in FIG. 8 has the configuration in which the elongate plate-shaped metal plate 51 is used. However, for example, the heating plate may adopt a configuration in which an arcuate plate-shaped metal plate bent with a curvature which substantially conforms to the outer circumference of the heat-shrinkable tube 41 is used instead of the elongate plate-shaped metal plate 51.

The length and the externally inserted position with respect to the optical fiber cable 1 of the heat-shrinkable tube 41 of the heat-shrinkable tube 43 with the adhesive are adjusted so that the heat-shrinkable tube 41 does not protrude from the rear end (the rear end of the stop ring 25) of the housing 21 of the optical connector 20 assembled in the later step in the rear side.

In FIG. 2, in the heat-shrinkable tube 41 (the heat-shrinkable tube 41 which configures a portion of the reinforced portion 40), the rear end opposite to the front end of the ferrule 30 side is positioned in the center portion in the longitudinal direction of the stop ring 25. For example, in the heat-shrinkable tube 41, the length thereof is further lengthened compared to the example of FIG. 2 within a range in which the rear end does not protrude from the rear end of the stop ring 25 in the rear side, and the rear end may be disposed near the rear end of the stop ring 25.

If the reinforced portion-forming step is completed, the housing 21 of the optical connector 20 is assembled and the ferrule 30 is accommodated in the housing 21 (housing assembling step).

In the housing assembling step, the ferrule 30 is inserted into the frame 24, the stop ring 25, the boot 23, and the spring 26 which are externally inserted to the optical fiber cable 1 are moved in the front side (ferrule 30 side) along the longitudinal direction of the optical fiber cable 1, the front end portion of the stop ring 25 is fitted (specifically, internally fitted) to the plug frame 24 and is assembled, and the housing 21 is assembled.

As shown in FIG. 3, locking holes 24b to which engagement protrusions 25a protruding in both sides of the front end portion of the stop ring 25 are fitted are formed on both sides of the rear end portion of the plug frame 24. The front end portion of the stop ring 25 is inserted from the rear end of the plug frame 24 to the inner side of the plug frame 24, the engagement protrusions 25a of both sides of the front end portion are fitted to the locking holes 24b of both sides of the rear end portion of the plug frame 24, and the stop ring 25 is fitted to the plug frame 24 and fixed thereto.

Moreover, in the housing assembling step, the knob 22 is externally inserted into the housing 21 from the front side and assembled after the assembly of the housing 21.

In addition, in the housing assembling step, grinding of the tip (front end) of the ferrule main body 31 (grinding step) is performed in a state where the assembly of the housing 21 is completed (a state where the knob 22 is not assembled) or a state where the assembly of the knob 22 is also completed. Thereby, along with the splice end surface 31b of the ferrule main body 31, the tip surface of the optical fiber 2 which is inserted into and fixed to the ferrule main body 31 also becomes a grinding surface which is continuous to the splice end surface 31b.

The boot 23 is externally inserted to the optical fiber cable 1 in a state where the boot is assembled to the stop ring 25 in advance and is moved to the front side along with the stop ring 25 in the housing assembling step or the boot 23 is externally inserted to the optical fiber cable 1 in a state where the boot is not assembled to the stop ring 25 and is assembled to the stop ring 25 in the housing assembling step.

If the housing assembling step that includes the grinding step is completed, the assembly of the optical fiber cable 10 with the connector is completed.

In the optical fiber cable 10 with the connector, since the reinforced portion 40 in the optical connector 20 has the configuration in which the rear side sleeve portion 32b of the ferrule 30, the tip portion of the optical fiber cable 1, and the heat-shrinkable tube 41 are integrated, mechanical strength between the rear side sleeve portion 32b of the ferrule 30 and the tip portion of the optical fiber cable 1 can be easily secured. The structure of the reinforced portion 40 is simple, and the reinforced portion 40 can be simply assembled at a low cost. Moreover, since a decrease in the size of the reinforced portion 40 is easily achieved, an influence on the size of the connector can be avoided. Like the shown example, the optical connector 20 of the optical fiber cable 10 with the connector can be assembled using the housing of a SC type optical connector.

In addition, since the optical connector 20 has the structure in which the optical fiber 2 protruding from the terminal of the optical fiber cable 1 is directly inserted into the ferrule 30 and fixed, compared to a field assembly type optical connector, the connecting points of the optical fiber are decreased. Since it is not necessary to accommodate the connecting points and anchoring means for anchoring the optical fiber cable is not required in the optical connector 20, the structure is simple, the entire length of the connector can be suppressed, and low costs are easily realized.

The optical fiber cable 1 of the optical fiber cable 10 with the connector freely inserts into the boot 23 of the optical connector 20 and can move in the axis line direction with respect to the boot 23. The optical fiber cable 1 can move in the axis line direction with respect to the housing 21. Thereby, for example, in the optical fiber cable 10 with the connector, when a pulling force toward the rear side with respect to the optical connector 20 acts on the optical fiber cable 1, the optical fiber cable 1, the ferrule 30, and the reinforced portion 40 are integrally displaced to the rear side with respect to the housing 21 of the optical connector 20. Moreover, in the optical fiber cable 10 with the connector, also when the ferrule 30 is pushed back at the time of the connector fitting of the optical connector 20, the optical fiber cable 1, the ferrule 30, and the reinforced portion 40 are integrally displaced to the rear side with respect to the housing 21 of the optical connector 20.

The optical fiber cable 10 with the connector is securely connected by the reinforced portion 40 between the ferrule 30 and the optical fiber cable 1 and is integrated. Thereby, in the optical fiber cable 10 with the connector, when the pulling force toward the rear side with respect to the optical connector 20 acts on the optical fiber cable 1 or the ferrule 30 is pushed back, it is possible to prevent the forces such as pulling and bending from intensively acting on the intermediate extension portion 2c of the optical fiber 2 of the optical fiber cable 1. Therefore, it is possible to prevent the intermediate extension portion 2c of the optical fiber 2 of the optical fiber cable 1 from being damaged due to the external force such as the pulling.

In the optical fiber cable 10 with the connector, since the reinforced portion 40 can secure high mechanical strength, for example, even in the use condition in which a relatively strong pulling force acts such as a drop cable, an optical property can be stably secured, and sufficient durability can be obtained.

Figure 9A:
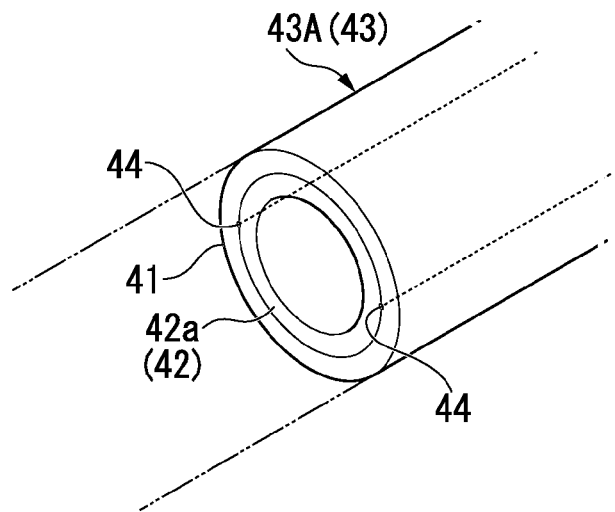
FIGS. 9A to 9C are perspective views showing another example of the heat-shrinkable tube with adhesive which is used in a reinforced portion-forming step in the assembly method of the optical fiber cable having a connector of the embodiment according to the present invention.
Figure 9B:
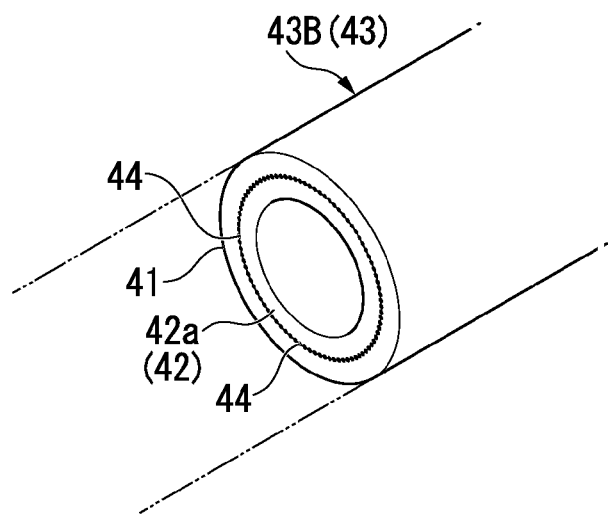
Figure 9C:
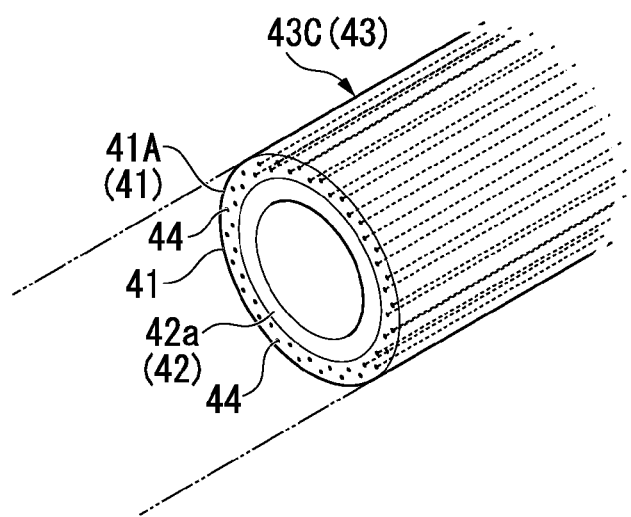

FIGS. 9A to 9C are cross-sectional perspective views showing modifications of the heat-shrinkable tube 43 with the adhesive.

As shown in FIGS. 9A to 9C, as the heat-shrinkable tube 43 with the adhesive, a configuration may be also adopted in which tensile strength fibers 44 which extends in the axis line direction of the heat-shrinkable tube 41 is substantially equally disposed in the circumferential direction of the heat-shrinkable tube 41.

For example, as the tensile strength fibers 44, an aramid fiber can be appropriately used. However, the tensile strength fibers are not limited thereto, and for example, a glass fiber, a carbon fiber, or the like can be also used.

In the heat-shrinkable tube 43 (a reference numeral 43A is added) with the adhesive exemplified in FIG. 9A, the tensile strength fibers 44 is interposed between the heat-shrinkable tube 41 and the ring-shaped adhesive layer 42a and is provided in the heat-shrinkable tube 41 in the direction which extends along the axis line direction. The tensile strength fibers 44 are provided in both sides opposite to each other via the center axis line of the cylindrical heat-shrinkable tube 41.

In the heat-shrinkable tube 43 (a reference numeral 43B is added) with the adhesive exemplified in FIG. 9B, the number of the tensile strength fibers 44 of the heat-shrinkable tube 43A with the adhesive exemplified in FIG. 9A increases, and the tensile strength fibers 44 are substantially equally disposed in a plurality of locations in the circumferential direction of the cylindrical heat-shrinkable tube 41.

In the heat-shrinkable tube 43 (a reference numeral 43C is added) with the adhesive exemplified in FIG. 9C, the heat-shrinkable tube 41A having the configuration in which the tensile strength fibers 44 extending along the axis line direction of the above-described heat-shrinkable tube 41 is embedded to the heat-shrinkable tube 41 is adopted as the heat-shrinkable tube. The tensile strength fibers 44 are substantially equally disposed in a plurality of locations in the circumferential direction of the cylindrical heat-shrinkable tube 41A.

The reinforced portion 40, which is formed using the heat-shrinkable tube 43 with the adhesive having the configuration in which the tensile strength fibers 44 is provided, has the configuration in which the tensile strength fibers 44 extends along the front and rear directions (the axis line direction of the housing 21) of the connector. The reinforced portion 40, which is formed using the heat-shrinkable tube 43A or 43B with the adhesive having the configuration in which the tensile strength fibers 44 is disposed inside the heat-shrinkable tube 41, has the configuration in which the tensile strength fibers 44 is embedded into the hot-melt adhesive 42 in the heat-shrinkable tube 41 which is heated and shrunk and is integrated.

The reinforced portion 40, which is formed using the heat-shrinkable tube 43 with the adhesive having the configuration in which the tensile strength fibers 44 is provided, provides a function which increases the strength with respect to the external force such as the pulling force or the bending stress in which the tensile strength fibers 44 acts on the reinforced portion 40.

As described above, the present invention is described based on the best mode. However, the present invention is not limited to the above-described best mode and various modifications are possible within the scope which does not depart from the gist of the present invention.

For example, the specific configuration of the optical connector is not limited at all as long as the configuration conforms to the technical idea of the present invention. The specific steps which assemble the optical connector can be also modified according to the specific configuration of the optical connector. The optical connector includes the ferrule and the housing which accommodates the ferrule. However, the optical connector may also adopt a connector in which the knob is not provided.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An optical fiber cable having an optical connector, comprising:

the optical connector assembled on a tip portion of the optical fiber cable, the optical fiber cable being configured to collectively cover a coated-optical fiber and tensile strength bodies with a jacket, the coated-optical fiber being configured to cover an outer circumferential surface of a bare optical fiber with a coating, the tensile strength bodies extending in parallel with both sides of the coated-optical fiber, the jacket being made of a synthetic resin;

a protruding portion of the bare optical fiber protruding from a terminal of the jacket being configured to be inserted into a ferrule of the optical connector to a splice end surface of the ferrule and fixed, the optical fiber cable being configured so that the tensile strength bodies do not protrude from the terminal of the jacket; and a reinforced portion formed in the optical connector as a result of heating and shrinking a heat-shrinkable tube and solidifying a hot-melt adhesive of an inner portion of the heat-shrinkable tube after melting the hot-melt adhesive so as to integrate a rear end portion of the ferrule, a jacket-tip portion including the terminal of the jacket which is disposed at a rear side of the ferrule so as to be separated therefrom, and the heat-shrinkable tube which accommodates the rear end portion of the ferrule and the jacket-tip portion and in which the hot-melt adhesive is disposed in the inner portion of the heat-shrinkable tube, the heat-shrinkable tube including tensile strength fibers which are different from the tensile strength bodies of the optical fiber cable, the tensile strength fibers being embedded in the heat-shrinkable tube or disposed inside the heat-shrinkable tube, the tensile strength fibers being substantially equally disposed in a plurality of locations in a circumferential direction of the heat-shrinkable tube, the tensile strength fibers extending along an axis line direction of the heat-shrinkable tube.

2. The optical fiber cable having the connector according to claim 1, further comprising a protrusion portion formed in the rear end portion of the ferrule, increasing pull-out resistance of the heat-shrinkable tube.

3. The optical fiber cable having the connector according to claim 2, wherein
the protrusion portion of the rear end portion of the ferrule is formed in a plurality of locations in an axis line direction of the rear end portion of the ferrule and is formed in a flange shape which extends along the circumferential direction of the outer circumference of the rear end portion of the ferrule,
the heat-shrinkable tube is formed in an uneven shape corresponding to an uneven shape of the rear end portion of the ferrule due to a presence of the protrusion portion, and
the heat-shrinkable tube is configured to come into press-contact with the rear end portion of the ferrule.

4. The optical fiber cable having the connector according to claim 3, wherein
the protrusion portion of the rear end portion of the ferrule is formed in a shape which is gradually tapered from a front face to a rear side in a direction perpendicular to the axis line direction of the rear end portion of the ferrule so as to reduce a protruding length from the outer circumference of the rear end portion of the ferrule.

5. The optical fiber cable having the connector according to claim 2, wherein the protrusion portion of the rear end portion of the ferrule is formed in a shape which is gradually tapered from a front face to a rear side in a direction perpendicular to the axis line direction of the rear end portion of the ferrule so as to reduce a protruding length from the outer circumference of the rear end portion of the ferrule.

6. An assembly method of an optical fiber cable having a connector, the optical fiber cable being configured to collectively cover a coated-optical fiber and tensile strength bodies with a jacket, the coated-optical fiber being configured to cover an outer circumferential surface of a bare optical fiber with a coating, the tensile strength bodies extending in parallel with both sides of the coated-optical fiber, the jacket being made of a synthetic resin, the assembly method comprising:
inserting and fixing a protruding portion of the bare optical fiber protruding from a terminal of the jacket into a ferrule, the protruding portion being configured so that a front end surface thereof is positioned in a splice end surface of the ferrule;
accommodating a rear end portion of an inserted and fixed ferrule and a jacket-tip portion including the terminal of the jacket, which is disposed at a rear side of the ferrule so as to be separated therefrom, into a heat-shrinkable tube in which a hot-melt adhesive is disposed in an inner portion of the heat-shrinkable tube in advance, the jacket-tip portion being configured so that the tensile strength bodies do not protrude from the terminal of the jacket, the heat-shrinkable tube including tensile strength fibers which are different from the tensile strength bodies of the optical fiber cable, the tensile strength fibers being embedded in the heat-shrinkable tube or disposed inside the heat-shrinkable tube, the tensile strength fibers being substantially equally disposed in a plurality of locations in a circumferential direction of the heat-shrinkable tube, the tensile strength fibers extending along an axis line direction of the heat-shrinkable tube, and
forming a reinforced portion, integrating the rear end portion of the ferrule, the jacket- tip portion, and the heat-shrinkable tube by heating and shrinking an accommodating heat-shrinkable tube and by solidifying the hot-melt adhesive in the heat-shrinkable tube after melting the hot-melt adhesive.

7. The assembly method of the optical fiber cable having the connector according to claim 6, further comprising a protrusion portion formed in the rear end portion of the ferrule, increasing pull-out resistance of the heat-shrinkable tube.

8. The assembly method of the optical fiber cable having the connector according to claim 7, wherein
the protrusion portion of the rear end portion of the ferrule is formed in a plurality of locations in an axis line direction of the rear end portion of the ferrule and is formed in a flange shape which extends along the circumferential direction of the outer circumference of the rear end portion of the ferrule,
the heat-shrinkable tube is formed in an uneven shape corresponding to an uneven shape of the rear end portion of the ferrule due to a presence of the protrusion portion, and
the heat-shrinkable tube is configured to come into press-contact with the rear end portion of the ferrule.

9. The assembly method of the optical fiber cable having the connector according to claim 8, wherein
the protrusion portion of the rear end portion of the ferrule is formed in a shape which is gradually tapered from a front face to a rear side in a direction perpendicular to the axis line direction of the rear end portion of the ferrule so as to reduce a protruding length from the outer circumference of the rear end portion of the ferrule.

10. The assembly method of the optical fiber cable having the connector according to claim 9, wherein
the heat-shrinkable tube is used in which the hot-melt adhesive is provided in a ring shape along an inner surface of a center portion in a longitudinal direction of the heat-shrinkable tube;
the rear end portion of the ferrule and the jacket-tip portion are accommodated inside the hot-melt adhesive; and
the heat-shrinkable tube is heated and shrunk.

11. The assembly method of the optical fiber cable having the connector according to claim 10, wherein
the tensile strength fibers are provided so as to be interposed between the heat-shrinkable tube and the hot-melt adhesive.

12. The assembly method of the optical fiber cable having the connector according to claim 8, wherein
the heat-shrinkable tube is used in which the hot-melt adhesive is provided in a ring shape along an inner surface of a center portion in a longitudinal direction of the heat-shrinkable tube;
the rear end portion of the ferrule and the jacket-tip portion are accommodated inside the hot-melt adhesive; and
the heat-shrinkable tube is heated and shrunk.

13. The assembly method of the optical fiber cable having the connector according to claim 12, wherein
the tensile strength fibers are provided so as to be interposed between the heat-shrinkable tube and the hot-melt adhesive.

14. The assembly method of the optical fiber cable having the connector according to claim 7, wherein the protrusion portion of the rear end portion of the ferrule is formed in a shape which is gradually tapered from a front face to a rear side in a direction perpendicular to the axis line direction of the rear end portion of the ferrule so as to reduce a protruding length from the outer circumference of the rear end portion of the ferrule.

15. The assembly method of the optical fiber cable having the connector according to claim 14, wherein the heat-shrinkable tube is used in which the hot-melt adhesive is provided in a ring shape along an inner surface of a center portion in a longitudinal direction of the heat-shrinkable tube;

the rear end portion of the ferrule and the jacket-tip portion are accommodated inside the hot-melt adhesive; and the heat-shrinkable tube is heated and shrunk.

16. The assembly method of the optical fiber cable having the connector according to claim 15, wherein the tensile strength fibers are provided so as to be interposed between the heat-shrinkable tube and the hot-melt adhesive.

17. The assembly method of the optical fiber cable having the connector according to claim 7, wherein the heat-shrinkable tube is used in which the hot-melt adhesive is provided in a ring shape along an inner surface of a center portion in a longitudinal direction of the heat-shrinkable tube;

the rear end portion of the ferrule and the jacket-tip portion are accommodated inside the hot-melt adhesive; and the heat-shrinkable tube is heated and shrunk.

18. The assembly method of the optical fiber cable having the connector according to claim 17, wherein the tensile strength fibers are provided so as to be interposed between the heat-shrinkable tube and the hot-melt adhesive.

19. The assembly method of the optical fiber cable having the connector according to claim 6, wherein the heat-shrinkable tube is used in which the hot-melt adhesive is provided in a ring shape along an inner surface of a center portion in a longitudinal direction of the heat-shrinkable tube;

the rear end portion of the ferrule and the jacket-tip portion are accommodated inside the hot-melt adhesive; and the heat-shrinkable tube is heated and shrunk.

20. The assembly method of the optical fiber cable having the connector according to claim 19, wherein the tensile strength fibers are provided so as to be interposed between the heat-shrinkable tube and the hot-melt adhesive.

* * * * *